20 Claims, 13 Drawing Figures

United States Patent [19]
Karijuku

[11] Patent Number: 4,486,892
[45] Date of Patent: Dec. 4, 1984

[54] SYNCHRONOUS SIGNAL GENERATOR

[75] Inventor: Akira Karijuku, Kumagaya, Japan

[73] Assignee: Tokyo Shibaura Denki Kabushiki Kaisha, Kawasaki, Japan

[21] Appl. No.: 400,406

[22] Filed: Jul. 21, 1982

[51] Int. Cl.³ .............................................. H04L 7/08
[52] U.S. Cl. .................................... 377/43; 375/119; 328/155
[58] Field of Search ................. 377/31, 43; 324/83 D; 375/118, 119; 328/155

[56] References Cited

U.S. PATENT DOCUMENTS

| 4,001,558 | 1/1977 | Kelling | 377/43 |
| 4,216,544 | 5/1980 | Boleda et al. | 375/119 |
| 4,247,898 | 1/1981 | Bosselaers | 324/83 D |

Primary Examiner—John S. Heyman
Attorney, Agent, or Firm—Cushman, Darby & Cushman

[57] ABSTRACT

A synchronous signal generator includes a counter controller for producing a control signal from a reference signal inputted thereto, and a counter circuit responsive to the control signal for generating a given cyclic signal. The counter controller accumulates each frequency of appearances of phase positions within a given period of time. When any of accumulated frequencies of the phase positions reaches to a given value from which the largest number of appearance times of the phase position is obtained, the counter controller supplies the counter circuit with the control signal. The counter circuit is reset or preset by the control signal. Since the probability that a phase position of the control signal is exactly coincide in time with a true phase position of the reference signal is very strong, the counter circuit can continue to repeat its cyclic count operation in synchronism with the control signal and yet being independent of the jittered reference signal.

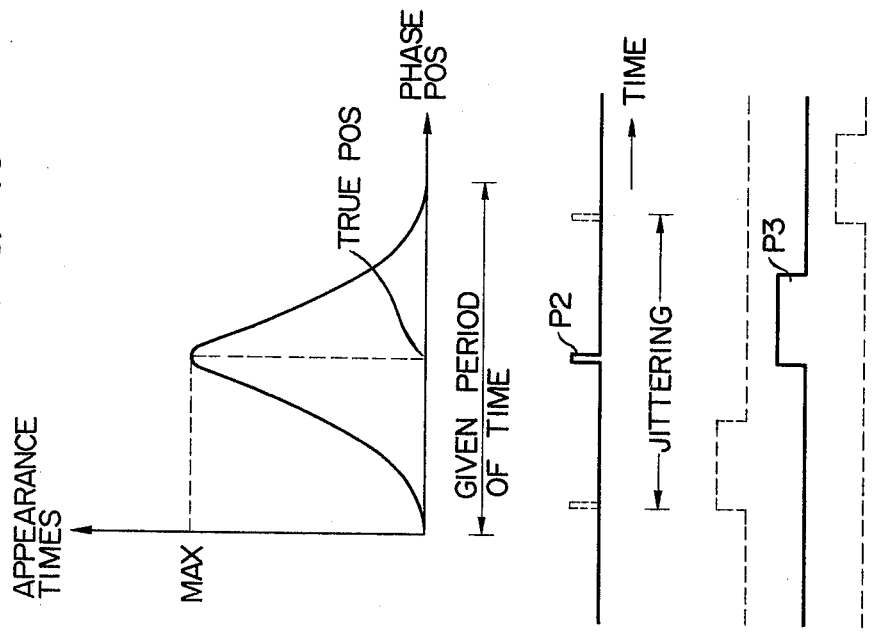
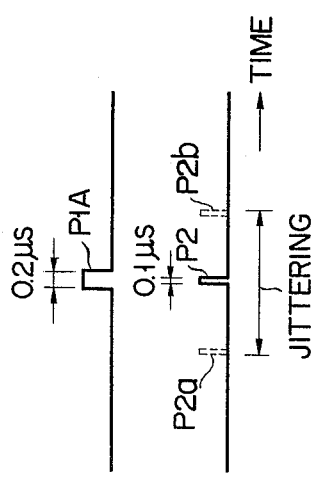
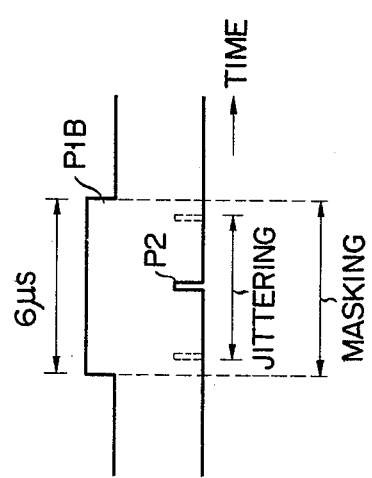

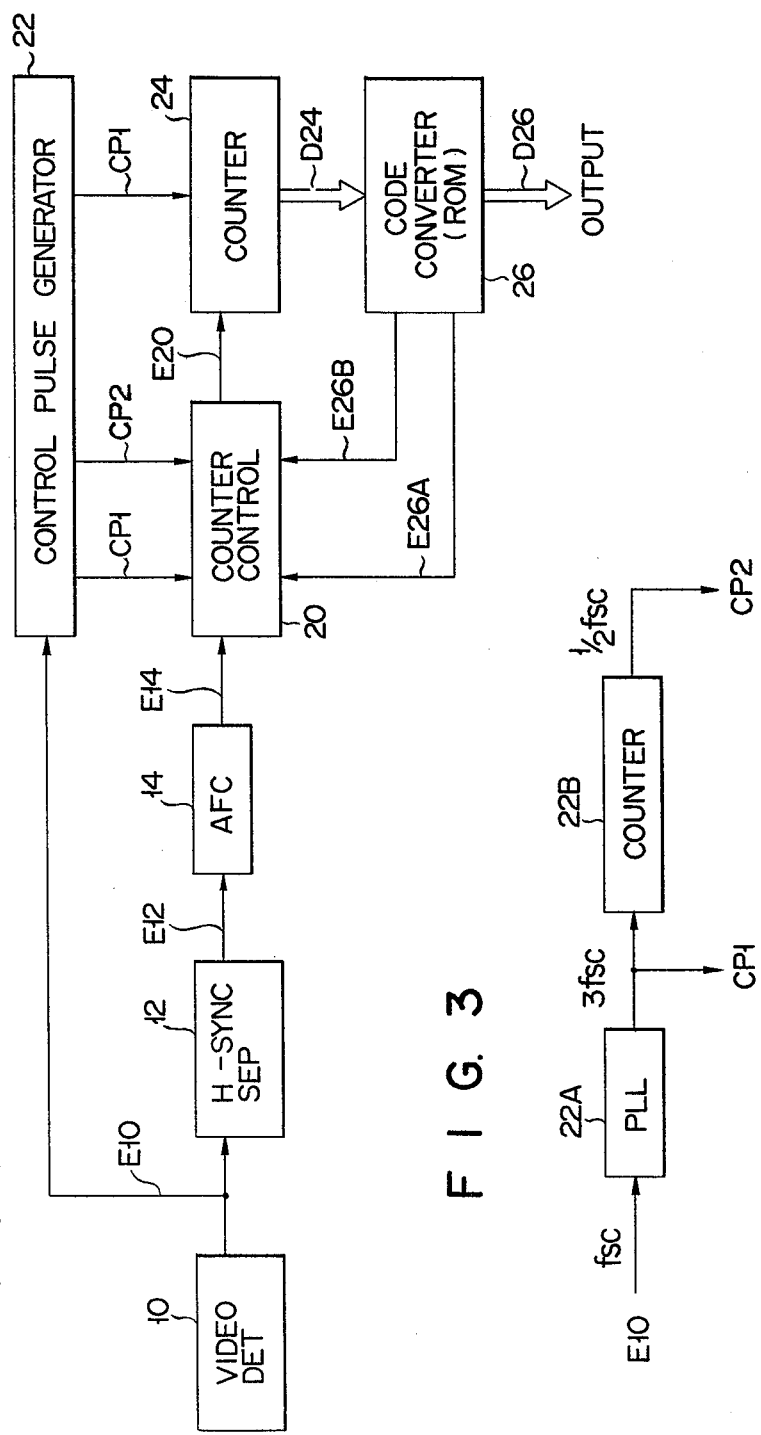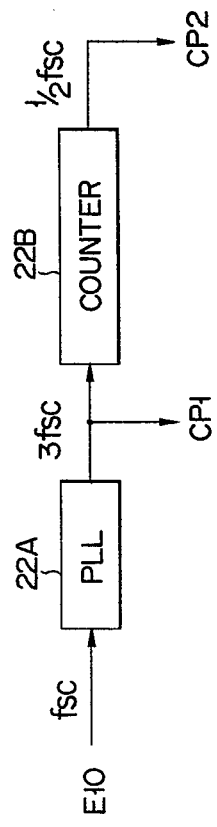

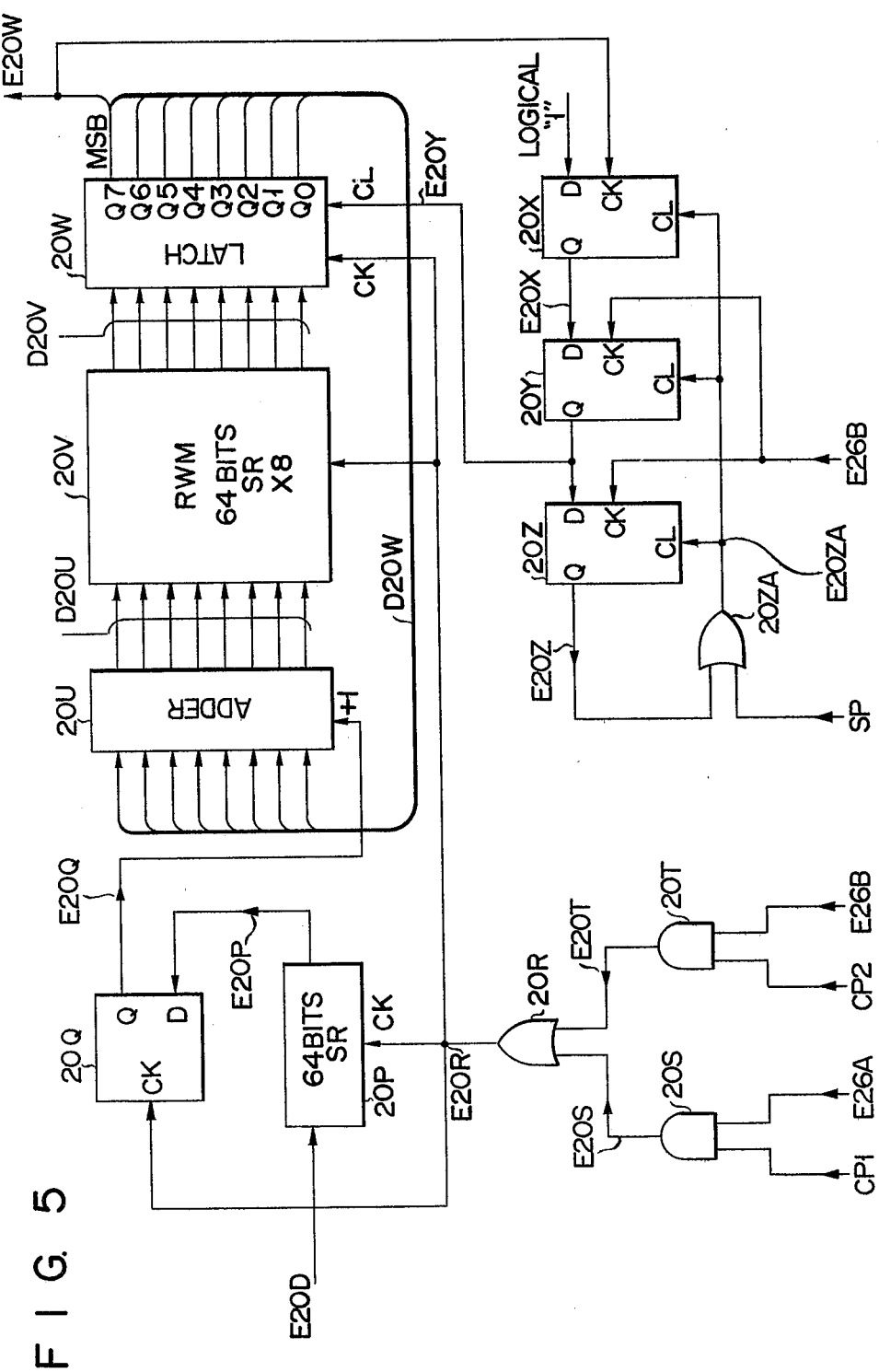
F I G. 5

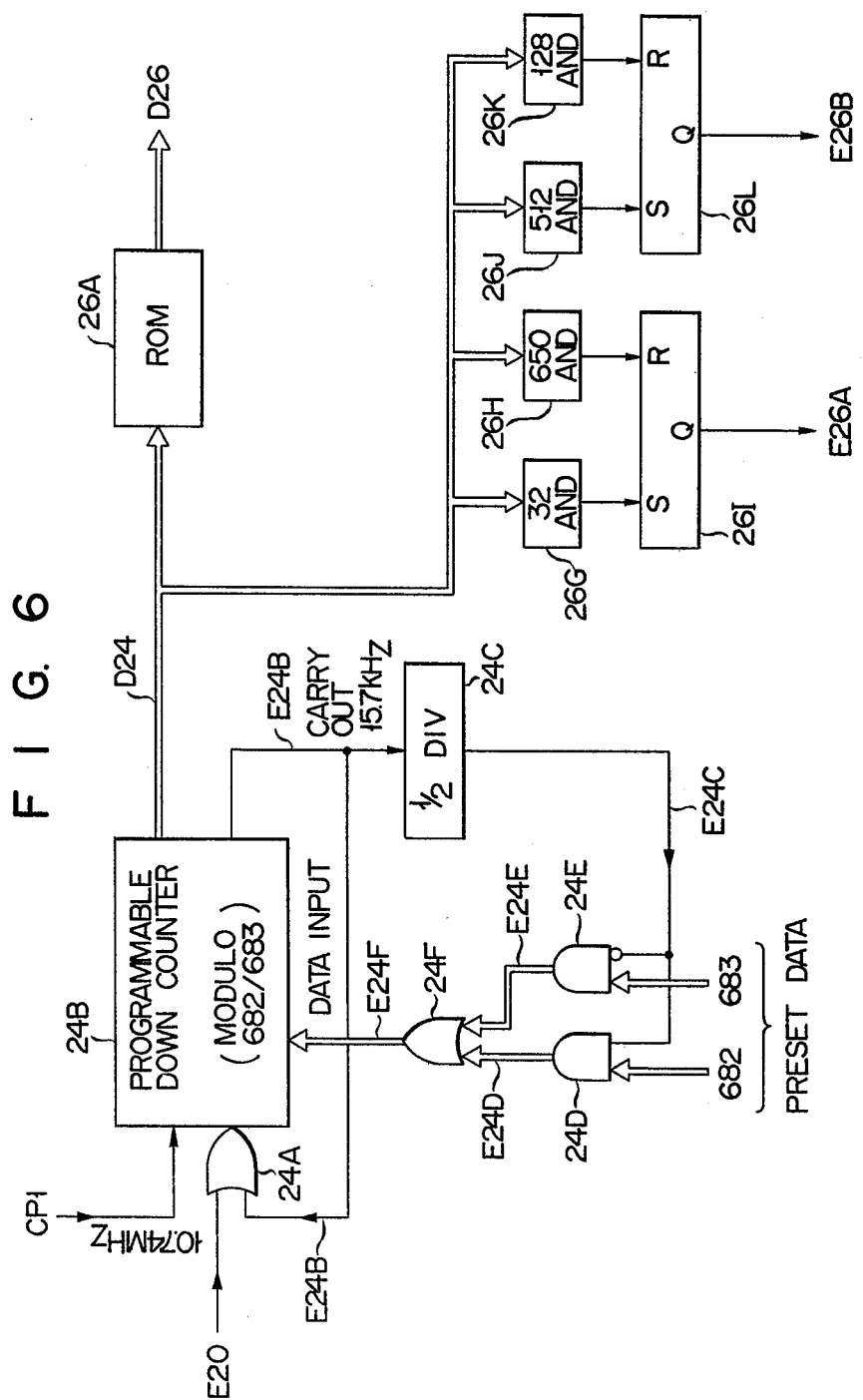
F I G. 6

SYNCHRONOUS SIGNAL GENERATOR

BACKGROUND OF THE INVENTION

This invention relates to a device for generating a given cyclic signal in synchronism with a reference signal applied to the device.

A device for generating a given cyclic signal is widely used in many technical fields. One typical example of such device is a synchronizing generator for regulating or governing the operation of a ghost canceller of TV receivers. In such synchronizing generator it is necessary to produce timing signals having exact and strict timing relation to a sync signal contained in a video signal. In compliance with this necessity, a synchronizing generator is usually furnished with a code converter or ROM for providing the timing signals and a counter for designating addresses of the ROM. The counter is reset or preset to a certain given value by, e.g., a horizontal sync signal, thereby the cyclic period of said timing signals is forcibly synchronized with the horizontal sync signal. Since, however, the sync signal is often subjected to jitter due to wow/flutter of VTR or ghost signals, if the counter is always reset (or preset) by such sync signal, the timing signals will suffer influence of the jitter.

To minimize the unfavorable influence of jitter, where the reset (preset) by a sync signal is once completed, then the sync signal applied to the counter is inhibited or masked by a masking pulse. The masking pulse is generated from the ROM at the timing of, e.g. count-start of the counter. Thus, once the counter is reset (preset) by one sync signal, then the subsequent sync signals are masked by the masking pulses, and the counter is continued to repeat its cyclic count operation independent of the sync signal. Accordingly, so long as the sync signal is masked, the counter is not influenced by the jitter of sync signals.

Now, following assumption are made to clarify the problem of prior art.

case 1 (FIG. 1A)
a masking pulse P1A and a reset pulse P2 have pulse widths of 0.2 $\mu$s and 0.1 $\mu$s, respectively.

case 2 (FIG. 1B)
a masking pulse P1B and a reset pulse P2 have pulse widths of 6 $\mu$s and 0.1 $\mu$s, respectively.

In case 1, if the reset pulse P2 appears at the time the masking pulse P1A appears, the pulse P2 is maked by the pulse P1A, and the counter is not reset by the pulse P2. Where the timing of appearance of the reset pulse does not coincide with that of the masking pulse P1A, the counter is reset by such unmasked reset pulse (P2$a$ or P2$b$). That is, the counter is sensitive to jittering in excess of the pulse width of 0.2 $\mu$s. In this case, although the counter is liable to be influenced by the jitter, the timing discrepancy between the count-start of said counter and the appearance of reset pulse P2 can be restricted within 0.2 $\mu$s at most.

In case 2, the counter is not influenced by the jitter of reset pulse P2 unless the jittering exceeds 6 $\mu$s pulse width of the masking pulse P1B. However, the timing discrepancy between the count-start and the reset pulse appearance could be large (6 $\mu$s), and timing error of 6 $\mu$s at maximum cannot be avoided.

As seen from above two cases, it will be understood that the requirement as to insensitivity for jitter is contradictory to that as to small timing error.

SUMMARY OF THE INVENTION

It is accordingly the object of the invention to provide a synchronous signal generator for producing a given cyclic signal which is synchronized with a reference signal applied to the generator with a minimum timing error and which is substantially insensitive to or free from the influence of jitter of the reference signal.

The present invention utilizes the following facts. A timing of appearance or a given phase position (P2) of the reference signal (P3) is varied with the jitter (FIG. 1C). Although the frequency of appearances of the reference signal at one phase position depends on the jitter, it is experimentally true that a specific phase position from which the maximum number of appearance times is obtained is, in view of probability, substantially independent of degree of the jitter. Thus, it can be said with reasonable certainty that such specific phase position corresponds to the true phase position of a reference signal without suffering influence of jitter.

To achieve the said object, a synchronous signal generator of the invention includes a counter controller for producing a control signal from a reference signal inputted thereto, and a counter circuit responsive to the control signal for generating a given cyclic signal. The counter controller accumulates each frequency of appearances of phase positions within a given period of time. When any of accumulated frequencies of the phase positions reaches to a given value from which the largest number of appearance times of the phase position is obtained, the counter controller supplies the counter circuit with the control signal. The counter circuit is reset or preset by the control signal. Since the probability that a phase position of the control signal is exactly coincide in time with a true phase position of the reference signal is very strong, the counter circuit can continue to repeat its cyclic count operation in synchronism with the control signal and yet being independent of the jittered reference signal. Accordingly, it is possible to obtain a given cyclic signal being exactly corresponding to the reference signal and being substantially free from the influence of jitter of the reference signal.

BRIEF DESCRIPTION OF THE DRAWINGS

FIG. 1A shows a narrow width masking pulse P1A and a reset pulse P2 derived from a reference signal which is subjected to jitter;

FIG. 1B shows a wide width masking pulse P1B and a reset pulse P2 being influenced by jitter;

FIG. 1C shows a graph indicating the distribution of phase position appearance times of a reset pulse P2 which is obtained from a jittered reference signal P3;

FIG. 2 shows a block diagram of a synchronous signal generator being applicable to a timing pulse generator of a ghost canceller of TV receivers;

FIG. 3 is a block configuration of a control pulse generator shown in FIG. 2;

FIGS. 4 and 5 show details of the counter controller shown in FIG. 2;

FIG. 6 shows details of the counter 24 and the code converter 26 shown in FIG. 2;

DETAILED DESCRIPTION OF THE PREFERRED EMBODIMENT

Figure 4:
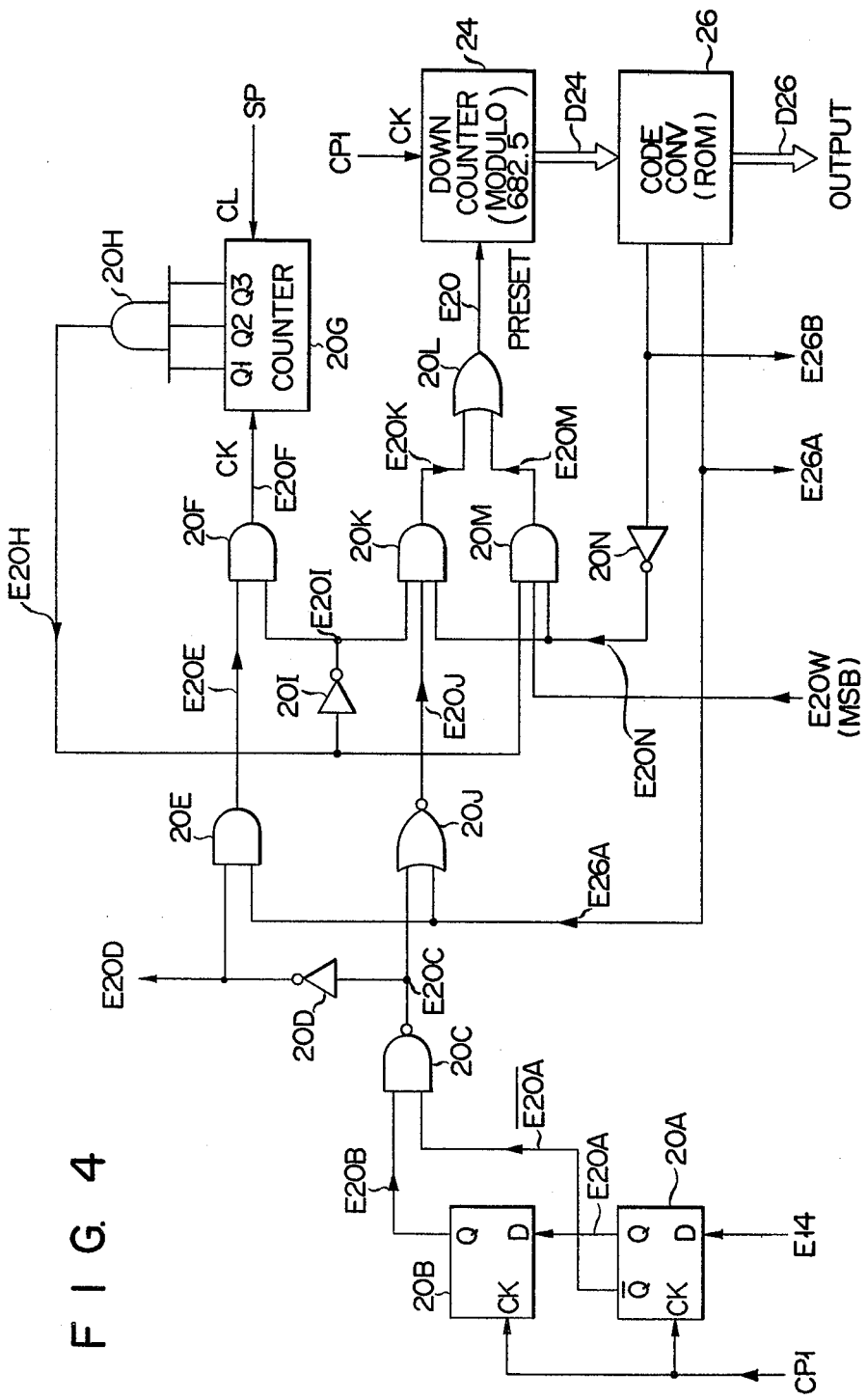

Description is now given with reference to the accompanying drawings of a synchronous signal generator embodying this invention.

FIG. 2 shows a general configuration of a synchronous signal generator which is applicable to a timing pulse generator of a ghost canceller of TV receivers. FIG. 3 shows a block configuration of a control pulse generator 22 of FIG. 2.

In FIG. 2 a video detector 10 provides a composite color video signal E10 of NTSC type, for example. Signal E10 is applied to a horizontal sync signal separator 12. Separator 12 separates a horizontal sync signal E12 (FIG. 7a) from a composite sync signal contained in signal E10. Signal E12 is applied to an AFC circuit 14. Circuit 14 outputs a controlled H-sync signal E14 (FIG. 7b) whose phase is automatically identified with the center phase position of H-sync signal E12. AFC circuit 14 is effective for reducing influence of noises or ghost components involved in video signal E10. Signal E14 is applied to a counter controller 20. Controller 20 receives clock pulses CP1 and CP2 as well as gate signals E26A and E26B (FIGS. 7d, 7e). Signals E26A and E26B are used for gating pulses CP1 and CP2, respectively. Pulses CP1 and CP2 are obtained from a control pulse generator 22. Generator 22 receives signal E10. Signal E10 contains a color subcarrier having a frequency $f_{sc}$ of about 3.58 MHz.

The generator 22 may be formed of a phase locked loop (PLL) circuit 22A and a counter 22B as shown in FIG. 3. PLL 22A is used as a frequency multiplier for tripling the subcarrier $f_{sc}$ to produce the pulse CP1 of $3f_{sc}$ ($\simeq$10.74 MHz). Counter 22B is used as a frequency divider for dividing $3f_{sc}$ in six to provide the pulse CP2 of $\frac{1}{2} f_{sc}$ ($\simeq$1.79 MHz).

Pulse CP1 is used for sampling a given part of video signal E14 and for storing the sampled part of the video signal. The sampled part may possess a specific phase position within a given period of time defined by the signal E26A (e.g. FIGS. 7c, 7d; t12). How many times the sampled part appears at respective specific phase positions are accumulated. Pulse CP2 is used for this accumulation operation. When one of the accumulated times or frequencies of appearances at a certain phase position reaches to a given maximum value (FIG. 8d; t16), the controller 20 outputs a control signal E20 (FIG. 7l; t16). Signal E20 is applied to a counter 24. Counter 24 may be a presettable or resettable counter of modulo N. Counter 24 receives pulse CP1 or any other proper pulse as a clock input. Counter 24 is reset to zero and counts pulse CP1 up to N, or it is preset to N and counts pulse CP1 down to zero. When no signal E20 is applied, counter 24 continues to repeat its cyclic count operation (e.g. FIGS. 7l, 7m; t10-t16). Where signal E20 appears, then counter 24 is forcibly reset (or preset) by signal E20 (FIGS. 7l, 7m; t16). The counted result of counter 24 is outputted as a count output D24 (FIG. 7m). Output D24 is applied to a code converter 26 containing a read-only memory (ROM). Converter 26 outputs a cyclic signal D26 (FIG. 7n) which is utilized, for example, as timing pulses of the ghost canceller of TV receivers. One example of such ghost canceller is disclosed in:

Makino et al., "A Novel Automatic Ghost Canceller"
IEEE Trans. CE-26,3,p629, Aug. 1980.

Output D24 designates the address of the ROM of converter 26. When output D24 corresponds to a predetermined count value, the ROM of converter 26 outputs the gate signal E26A (FIG. 7d) and thereafter outputs the gate signal E26B (FIG. 7e) which is used for enabling said accumulation operation of phase position appearance times of the sampled part.

Figure 7:
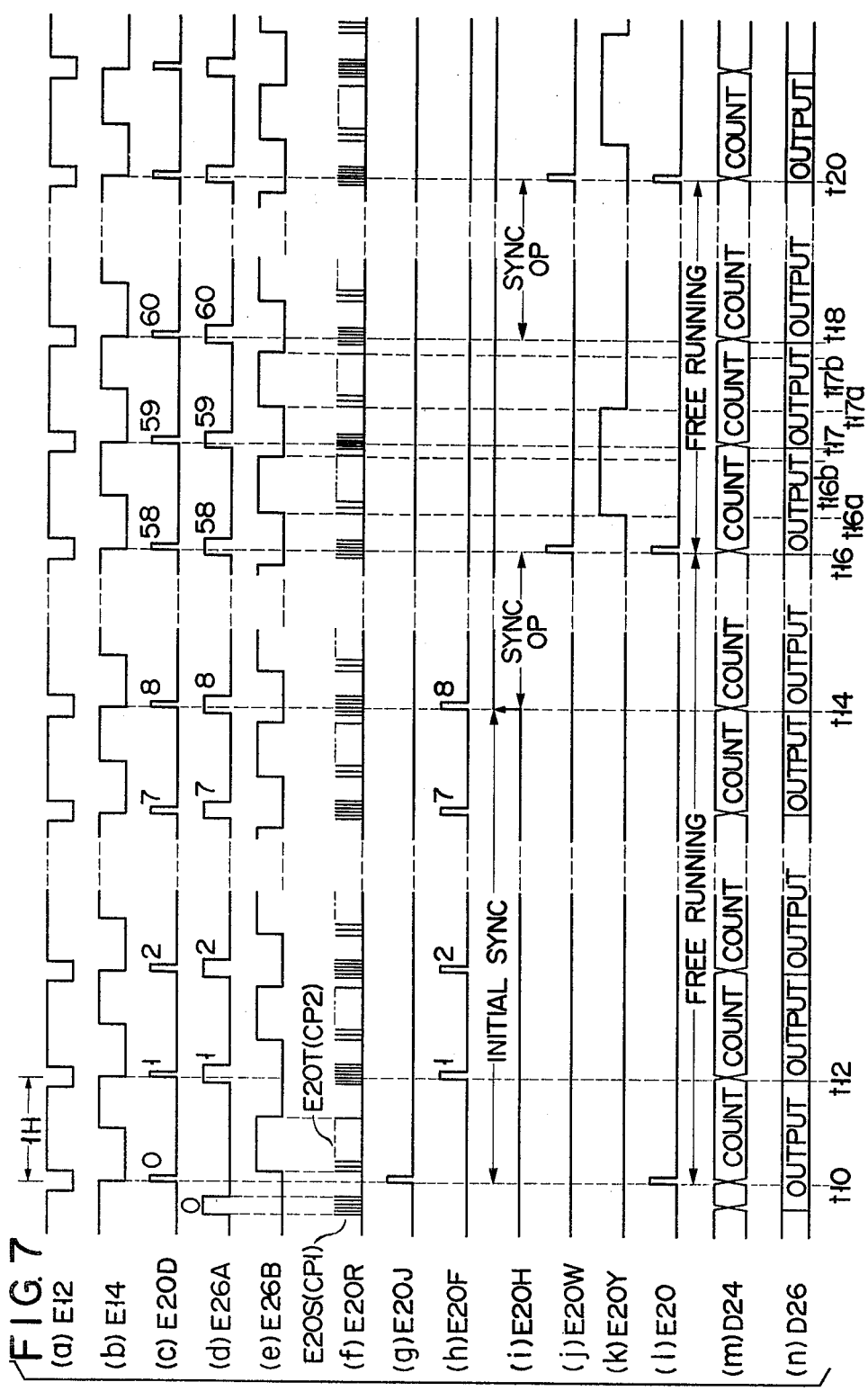
FIGS. 7 and 8 are timing charts illustrating the operation of the counter controller shown in FIGS. 4 and 5.
Figure 8:
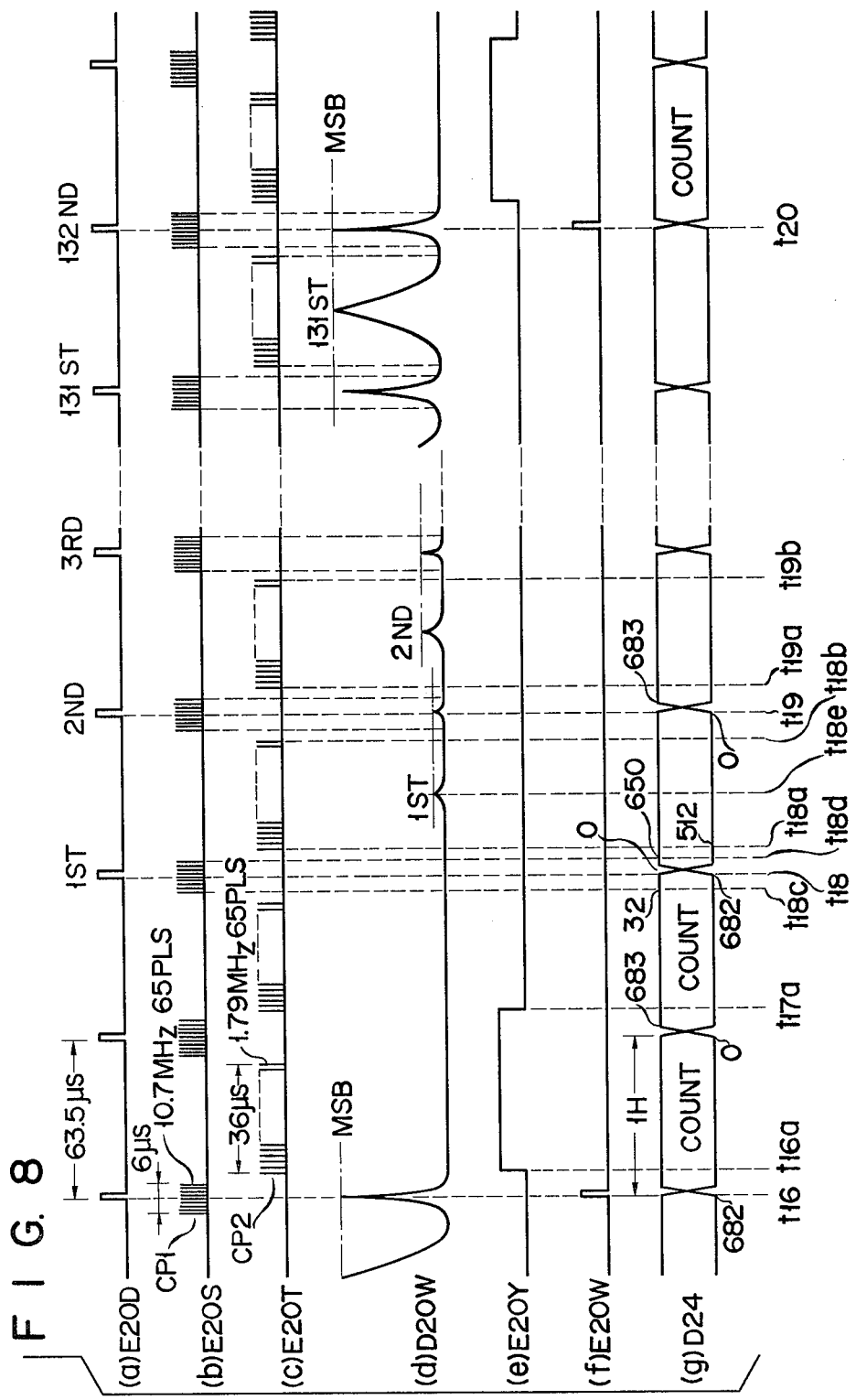

FIGS. 4 and 5 show details of the counter controller 20 shown in FIG. 2. FIGS. 7 and 8 is a timing chart illustrating the operation of the controller 20 shown in FIGS. 4 and 5.

In FIG. 4 the controlled H-sync signal E14 (FIG. 7b) is applied to a D input of a D type flip-flop (FF) 20A. An output E20A of FF 20A is applied to a D input of a D type FF 20B. Each clock input CK of FF's 20A and 20B receives the pulse CP1 (10.74 MHz). An inverted output $\overline{E20A}$ of FF 20A whose logical level is opposite to that of output E20A is applied to one input of a NAND gate 20C. The other input of gate 20C receives an output E20B of FF 20B. A gated output pulse E20C of gate 20C is inverted by an inverter 20D. Inverter 20D outputs a sampled pulse E20D (FIGS. 7c, 8a).

The components 20A–20D form a sampling circuit for providing a sampled pulse E20D whose pulse width corresponds to the period of the pulse CP1 and whose phase position corresponds to the falling edge portion or specific phase position of the signal E14.

Figure 10:
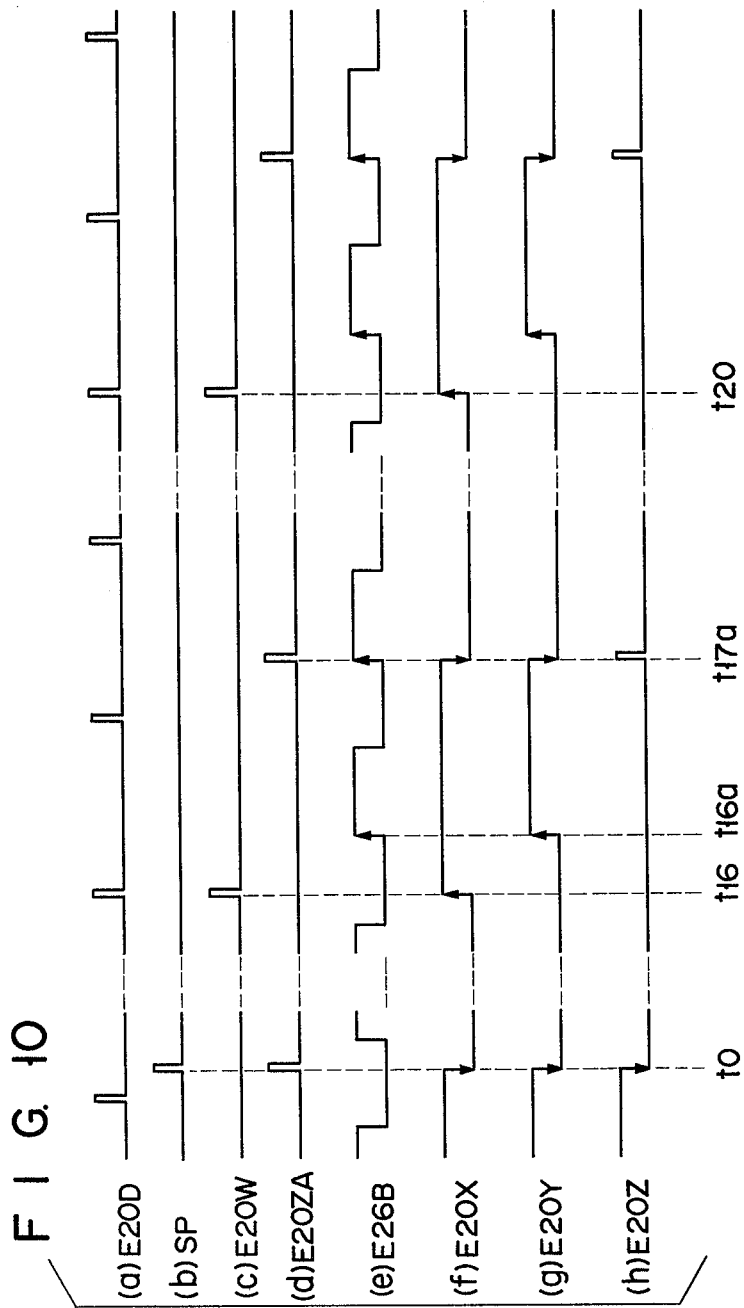
FIG. 10 is a timing chart illustrating the operation of the flip-flop circuit 20X-20ZA shown in FIG. 5.

Pulse E20D is applied to one input of an AND gate 20E. The other input of gate 20E receives the signal E26A (FIG. 7d) which is obtained from the ROM of converter 26. Gate 20E supplies one input of an AND gate 20F with a gated output E20E. Gate 20F receives at the other input a gating signal E20I. A gated output pulse E20F (FIG. 7h) of gate 20F is applied to a clock input of a 3-bit binary counter or modulo 8 counter 20G. Counter 20G is cleared or reset by a start pulse SP (FIG. 10b). Pulse SP is generated at the time of power-ON of TV receiver or channel change thereof, for example. After the clearing, counter 20G starts to count the pulse E20F, and the count results Q1–Q3 are applied to a 3-input AND gate 20H. Gate 20H outputs a switch signal E20H (FIG. 7i) whose logical level is "1" only when counter 20G completes the count of eight clock pulses of E20F, i.e. only when results Q1–Q3 are all logical "1". Signal E20H is applied to an inverter 20I, and inverter 20I outputs said gating signal E20I.

The components 20E–20H form a timer counter circuit for counting the sampled pulse E20D and generating a switch signal E20H when a given number of sampled pulses, e.g. 8 pulses is counted (FIG. 7c; t12-t14).

The pulse E20C and signal E26A are applied to a NOR gate 20J. Gate 20J supplies a first input of an AND gate 20K with its output pulse or an initial sync pulse E20J (FIG. 7g). A second input of gate 20K receives the gating signal E20I and a third input of gate 20K receives a gating signal E20N. A gated output E20K of gate 20K is applied to an OR gate 20L. Gate 20L outputs the control signal E20 (FIG. 7l).

The components 20J forms an initial set circuit for generating an initial sync pulse E20J when the sampled pulse E20D and the gate signal E26A appear simultaneously.

Signal E20 is applied to the counter 24. In this embodiment, counter 24 is a down counter of modulo "682.5". Counter 24 is preset by signal E20 to decimal "682" or "683" and counts the pulse CP1 (10.74 MHz) down to "0". Where the count results of counter 24 becomes "0", then the contents of counter 24 is renewed to "683" or "682" by the subsequent pulse CP1 even if the signal E20 is not applied to counter 24. Thus, counter 24 free runs or continues its cyclic count operation of modulo "682.5" which corresponds to the average of modulo "682" and modulo "683". Since the frequency of pulse CP1 is 10.74 MHz, the repetitive frequency of count output D24 is 10.74 MHz/682.5≈15.7 kHz. This frequency 15.7 kHz is identical with the frequency of H-sync signal of a TV system.

Count output D24 having a repetition frequency 15.7 kHz designates the address of the ROM of converter 26. Converter 26 outputs cyclic signal D26 having repetitive frequency 15.7 kHz. Converter 26 also outputs gate signal E26A (FIG. 7d) and gate signal E26B (FIG. 7e) according to the contents of output D24 (FIGS. 7m, 8g). Signal E26B is applied to an inverter 20N. Inverter 20N outputs said signal E20N. Signals E20H and E20N are respectively applied to first and second inputs of an AND gate 20M. Gate 20M receives at its third input a set pulse E20W (FIGS. 7j, 8f) which indicates the peak or maximum position of the appearance distribution graph shown in FIG. 1C. A gated output E20M of gate 20M is applied to OR gate 20L. Thus, the control signal E20 is a logical OR of outputs E20K and E20M. Incidentally, how to obtain the set pulse E20W will be described latter.

The components 20I–20N form a selector circuit for selecting as the control signal E20 either the initial sync pulse E20J or the set pulse E20W.

Reference is now given to FIG. 5. The sampled pulse E20D obtained from inverter 20D is applied to a shift register (SR) 20P having a capacity of 64 bits. SR 20P stores pulse E20D (FIG. 7c) by the clocking of a shift clock signal E20R (FIG. 7f). Signal E20R is obtained from an OR gate 20R. Gate 20R receives a read/write pulse E20S (FIG. 8b) and an accumulation operation pulse E20T (FIG. 8c). Pulse E20S is derived from an AND gate 20S which receives the pulse CP1 (10.74 MHz) and the gate signal E26A. Pulse E20T is derived from an AND gate 20T which receives the pulse CP2 (1.79 MHz) and the gate signal E26B. Thus, the signal E20R is formed of pulse CP1 gated by signal E26A and pulse CP2 gated by signal E26B as shown in FIG. 7f. SR 20P outputs its stored contents as a pulse E20P by means of clocking of signal E20R. Signal E20P is applied to a D input of a D type FF 20Q. FF 20Q is clocked by signal E20R and outputs a position pulse E20Q. Pulse E20Q is applied to a 8-bit adder 20U. Adder 20U receives an accumulated data D20W (FIG. 8d) of 8 bits and adds the digital "1" of pulse E20Q to data D20W. Then, adder 20U outputs added data D20U whose contents are incremented by "1" from the preceding contents of data D20U.

The components 20P–20T form a register circuit for storing the sampled pulse E20D when the gate signal E26A is generated, and for outputting the stored contents as a position pulse E20Q when the gate signal E26B is generated. The components 20U forms an addition circuit for adding the position pulse E20Q to the contents (D20W) of adder 20U to provide added data D20U.

Data D20U is applied to a read/write memory (RWM) 20V. RWM 20V may be formed of 8-stack 64-bit shift register array. Each shift register of RWM 20V is clocked by the signal E20R. RWM 20V stores each bit of data D20U and outputs an 8-bit parallel data D20V in synchronism with the clocking of signal E20R.

Data D20V is applied to an 8-bit latch 20W. Latch 20W stores the contents of data D20V when the logical "1" of signal E20R is applied thereto and retains the stored data when signal E20R is absent or logical "0". Latch 20W provides adder 20U with said accumulated data D20W. Thus, the circuit components 20U, 20V and 20W form a closed loop circuitry for accumulating the position pulse E20Q by means of the clocking of signal E20R.

The most significant bit (MSB) for data D20W is used as said set pulse E20W which is applied to gate 20M of FIG. 4. Pulse E20W (FIGS. 7j, 8f, 10c) is applied to a clock input of a D type FF 20X whose D input receives a logical "1" signal. An output E20X (FIG. 10f) of FF 20X is applied to a D input of a D type FF 20Y. An output E20Y (FIGS. 7k, 8e, 10g) of FF 20Y is applied to a D input of a D type FF 20Z as well as to a clear input of latch 20W. Logical "1" of output E20Y clears latch 20W. FF's 20Y and 20Z are clocked by the gate signal E26B (FIG. 10e). An output E20Z (FIG. 10h) of FF 20Z is applied to one input of an OR gate 20ZA. Gate 20ZA receives at the other input said start pulse SP (FIG. 10b). An output E20ZA (FIG. 10d) is applied to each clear input of FF's 20X, 20Y and 20Z.

The components 20V–20ZA form an integration memory circuit for memorizing the added data D20U and providing an accumulated data D20W whose most significant bit (MSB) is used as the set pulse E20W and which is inputted to the adder 20U.

FIG. 6 shows details of the counter 24 and the converter 26 shown in FIG. 4.

In FIG. 6, the control signal E20 is applied to one input of an OR gate 24A. The output of gate 24A is coupled to the preset input of a programmable down counter 24B being formed of 10-bit binary counter. Counter 24B is clocked by clock pulse CP1. Where the count result becomes "0", then counter 24B generates a carry out E24B (FIG. 9e). Carry out E24B is applied to the other input of gate 24A and to a ½ frequency divider 24C. Divider 24C is triggered by the falling edge of carry out E24B and generates a data change signal E24C (FIG. 9d). Signal E24C is applied to a noninverted input of an AND gate 24D and to an inverted input of an AND gate 24E. Gate 24D receives at other 10-bit input the preset data "682" and gate 24E receives at other 10-bit input the preset data "683". A gated output E24D of gate 24D and a gated output E24E of gate 24E are applied to an OR gate 24F. Gate 24F provides the preset data input of counter 24B with an output E24F corresponding to the data "682" or "683".

Where the logical level of control signal E20 or the logical level of carry out E24B is changed from "0" to "1" and the logical level of signal E24C is "1" (FIG. 9d; t16), then output E24F corresponding to data "682" is preset to counter 24B by the rising edge of carry out E24B (FIG. 9e; t16). Where the logical level of signal E24C is "0" (FIG. 9d; t17) and carry out E24B becomes to "1", then output E24F corresponding to data "683" is preset to counter 24B by the rising edge of carry out E24B (FIG. 9e; t17). Even though carry out E24B disappears, when control signal E20 appears, counter 24B is preset to "682" or "683" according to the logical level of data change signal E24C.

The count output D24 of counter 24B is applied to a ROM 26A which generates the cyclic signal D26. Output D24 is also applied to AND gates 26G, 26H, 26J and 26K each of which is furnished with 10-bit inputs. When output D24 corresponds to decimal "32", gate 26G sets a set-reset flip-flop (FF) 26I and FF 26I outputs the gate signal E26A. When output D24 is changed from "32" to "650" via the count data of "682" or "683", FF 26I is reset by gate 26H, and signal E26A disappears (FIGS. 9a, 9c). When output D24 corresponds to "512", gate 26J sets an FF 26L and FF 26L outputs the gate signal E26B. When output D24 becomes to "128", FF 26L is reset by gate 26K and signal E26B disappears (FIGS. 9b, 9c).

A detailed explanation for operation of the counter controller 20 shown in FIGS. 4 and 5 will be given with reference to FIGS. 7 to 11.

Assume here that the start pulse SP is once rendered to logical "1" (FIG. 10b; t0) before time t10 and thereafter it keeps logical "0". Thus, counter 20G and FF's 20X, 20Y and 20Z are all cleared well before time t10 (FIGS. 10f, 10g, 10h; t0).

At time t10, the logical level of signal E14 is changed from "1" to "0" (FIG. 7b), and FF 20A is clocked by one of pulse CP1 (not shown) under D="0". Then, outputs E20A and $\overline{E20A}$ become to "0" and "1", respectively. At this time, since FF 20B has not yet been clocked under D=E20A="0", output E20B is still logical "1" even after clocking of said one of pulse CP1. As signal E20B is logical "1" and the logical level of signal E20A has been changed from "0" to "1", i.e. $\overline{E20A}$=E20B="1", the logical level of pulse E20C becomes to "0" and pulse E20D becomes to "1" (FIG. 7c; t10). When FF's 20A and 20B are clocked by the next subsequent pulse CP1, since signal E20A has been logical "0", outut E20B is changed from "1" to "0". Then, signal E20C becomes to logical "1" and signal E20D becomes to logical "0" immediately after time t10 (FIG. 7c). Accordingly, pulse E20D appears at the falling edge portion of signal E14 and has a pulse width corresponding to one period of pulse CP1 (FIGS. 7b, 7c). Where pulse E20D appears at the time when signal E26A disappears (FIGS. 7c, 7d; t10), then the relations E20D="1", E20C="0" and E26A="0" are held, and the output pulse E20J of gate 20J becomes to logical "1" (FIG. 7g; t10). At this time, since signals E20B and E20H are logical "0" (FIGS. 7e, 7i; t10), signals E20I and E20N are both logical "1", and gate 20K is opened, whereas gate 20M is closed for the logical "0" of signal E20H. Accordingly, only the pulse E20J passes through gates 20K and 20L and is applied as the control signal E20 to the preset input of counter 24 (FIG. 7l; t10). At time t10, counter 24 is preset to "682" or to "683" by signal E20. Then, counter 24 counts the preset data "682" or "683" down to "0" by pulse CP1 (FIG. 9c).

Figure 9:
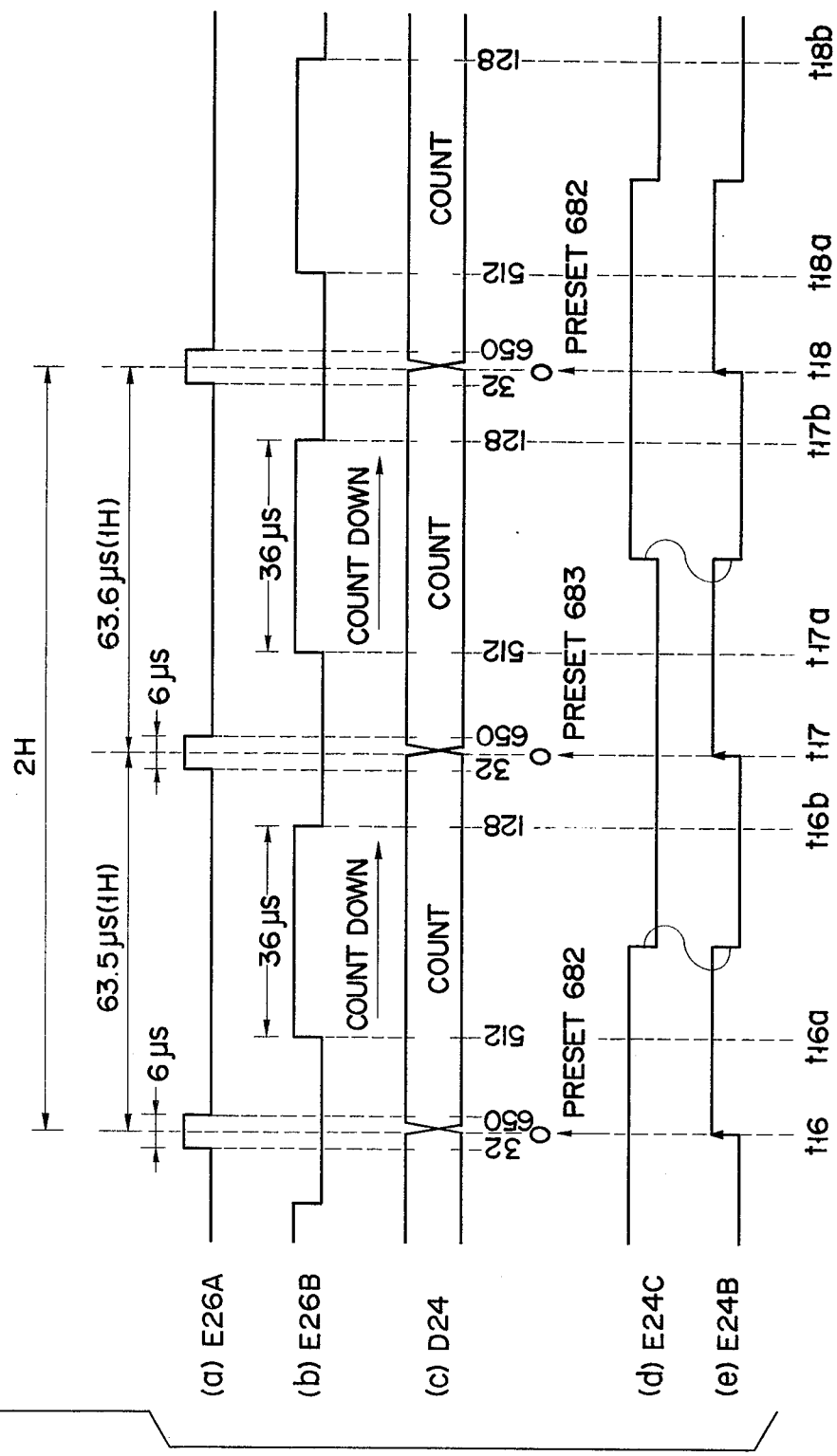
FIG. 9 is a timing chart illustrating the operation of the circuitry of FIG. 6.

The period of time being required for fully counting down the data "682" or "683" by pulse CP1 of 10.74 MHz is 63.5 μs or 63.6 μs (FIG. 9). Thus, the preset data "682" or "683" is corresponding to the horizontal scanning period 1 H (63.5 μs) of TV system with a timing error of 0.1 μs or less. This timing error of 0.1 μs corresponds only to one clock of pulse CP1. Accordingly, where converter 26 outputs the gate signal E26A having pulse width of 6 μs and the center position of signal E26A corresponds to the count "0" of counter 24 (FIGS. 9a, 9c), then the pulse E20D and the center position of signal E26A will appear simultaneously (FIGS. 7c, 7d; t12). That is, once counter 24 is preset by initial sync pulse E20J (FIG. 7g; t10), then pulse E20D is masked by signal E26A, and pulse E20J will not appear after the preset of counter 24 (FIG. 7g; t12 and thereafter), unless the phase position of pulse E20D is unduly varied in excess of 6 μs. Where pulse E20D is masked by signal E26A, since the logical level of pulses E20D and E26A are both "1", then gate 20E is opened and the gated output E20E appears. Since, at this time, the logical level of signals E20H and E20I are "0" and "1" respectively, gate 20F is opened and counter 20G counts the gated output E20F corresponding to pulse E20D (FIGS. 7c, 7h; t12-t14). During the period of time from t10 to t14, counter 24 freely runs its cyclic count operation of modulo "682" or "683", and converter 26 outputs the cyclic signal D26 corresponding to the count of counter 24 in accordance with the count output D24 (FIG. 7m, 7n).

When counter 20G completes the count of 8 pulses of said output E20F, the logical level of signal E20H changes from "0" to "1" (FIG. 7i; t14). At this time signal E26B is logical "0". Accordingly, signal E20I is logical "0" for E20H="1" and signal E20N is logical "1" for E26B="0". Thus, gates 20F and 20K are closed and gate 20M is opened. During the period of time wherein counter 20G counts 8 pulses of output E20F, counter 24 can be completely synchronized with pulse E20D. However, since the pulse width of signal E26A is wide (6 μs), about 6 μs of timing discrepancy between the appearance of pulse E20D and the preset time of counter 24 could occur. When signal E20H becomes to logical "1" (FIG. 7i; t14), since gate 20K is closed and gate 20M is opened, the set pulse E20W is allowed to go to counter 24. In this case pulse E20W is used as the control signal E20 in place of the initial sync pulse E20J (FIGS. 7g, 7j, 7l; t16, t20).

The initial synchronization of counter 24 is completed by time t14. After the completion of initial sync operation, the minute sync operation utilizing the probability of appearance frequency of pulse E20D is carried out by the circuitry of FIG. 5.

Here, the explanation will be given to the period between time t16 and time t20.

At time t16, when the contents of one of accumulated data D20W reaches at the most significant bit (MSB), the set pulse E20W appears (FIGS. 7j, 8d, 8f; t11). By the signal E20 corresponding to this pulse E20W, data "682" is preset to counter 24B of FIG. 6 (FIGS. 8g, 9c), and FF 20X is clocked to generate the logical "1" of signal E20X (FIGS. 10c, 10f; t16). When counter 24B counts 170 pulses of pulse CP1 after time t16, i.e. the contents of counter 24B becomes to "512", FF 26L (FIG. 6) is set so that the logical level of gate signal E26B is changed from "0" to "1" (FIGS. 7e, 9b, 9c, 10e; t16a). FF 20Y is clocked under the condition of D=E20X="1" by the rising edge of signal E26B and it generates the output E20Y (FIGS. 7k, 8e, 10g; t16a). Output E20Y clears latch 20W to make all contents of data D20W including the pulse E20W be logical "0". When the contents of counter 24B reaches at "128", FF 26L is reset and signal E26B disappears (FIGS. 7e, 9b; t16b). Where the count of data "682" is completed, counter 24B is preset to "683" by its carry out E24B under E24C="0" (FIGS. 9c, 9d, 9e; t17). Then counter 24B performs the down count of data "683" by clock pulse CP1. When the contents of counter 24B becomes to "512", FF 26L is set to generate signal E26B (FIGS. 7e, 9b, 9c, 10e; t17a). The rising edge of signal E26B at time t17a clocks FF's 20Y and 20Z under the condition of E20X="1" and E20Y="1" (FIGS. 10e, 10f, 10g). Then, output E20Z becomes to logical "1" (FIG. 10h; t17a) and output E20ZA also becomes to logical "1" (FIG. 10d; t17a). Immediately after time t17a, since this outut E20ZA clears FF's 20X, 20Y and 20Z, outputs E20X, E20Y and E20Z are all logical "0". When counter 24B counts its contents down to "128", FF 26L is reset and signal E26B disappears (FIGS. 7e, 9b; t17b). Where the counting operation of data "683" is finished, then counter 24B is again preset by the rising edge of signal E24B to "682" under E24C="1" (FIGS. 9c, 9d, 9e; t18).

The accumulation of appearances of the sampled pulse E20D will be carried out as follows.

During the period of time wherein the contents of counter 24B fall within "32" through "650", FF 26I generates the gate signal E26A (FIGS. 9a, 9c; about t18). When signal E26A is generated, since AND gate 20S is opened, the read/write pulse E20S appears (FIG. 8b; t18c-t18d). Then, 65 pulses of CP1 are passed through the gates 20S and 20R and are used as the shift clock signal E20R (FIG. 7f). If a first one of sampled pulse E20D appears at the time when the contents of counter 24B become to "0", the 32th bit of SR 20P stores the logical "1" of the first sampled pulse E20D (FIG. 8a; t18). In other words, SR 20P stores the specific phase position of first sampled pulse E20D in reference to the gate signal E26A. After such storage operation of the phase position of pulse E20D, during the period of time wherein the contents of counter 24B fall within "512" to "128", FF 26L generates the gate signal E26B (FIGS. 9b, 9c; t18a-t18b). When signal E26B is generated, since AND gate 20T is opened, the accumulation operation pulse E20T appears (FIG. 8c; t18a-t18b). Then, 65 pulses of CP2 are passed through gates 20T and 20R, and these 65 pulses are used as the signal E20R (FIG. 7f).

Signal E20R clocks FF 20Q, RWM 20V and latch 20W. Unless logical "1" of 32th bit of SR 20P is read out, the logical level of pulses E20P and E20Q are "0", and no addition operation is performed in adder 20U. When 32 times of clocking by signal E20R are completed, SR 20P outputs the logical "1" of the contents of 32th bit. Thus, pulse E20P becomes to logical "1" which indicates said specific phase position of sampled pulse E20D stored in the 32th bit of SR 20P. The logical "1" of 32th contents is applied to the D input of FF 20Q. FF 20Q is clocked by the next subsequent one of signal E20R under the condition of D=E20P="1", and the position pulse E20Q becomes to logical "1". This logical "1" of pulse E20Q is added to the accumulated data D20W. Then, data D20W being incremented by "1" is stored in RWM 20V by further subsequent signal E20R. When the supply of 65 pulses of signal E20R is finished, the incremented portion of data D20W which corresponds to said specific phase position of sampled pulse E20D is stored in the 32th bit location of RWM 20V (FIG. 8d; t18e).

The stored contents of RWM 20V are sequentially read out by the next pulse block of E20S (FIG. 8b; about t19). At the same time, SR 20P stores the specific phase position of a second sampled pulse E20D (FIG. 8a; t19). The contents of SR 20P is added by adder 20U to the data D20W containing the phase position information of said first sampled pulse E20D. That is, if the second one of sampled pulse E20D again appears at the time when the contents of counter 24B become to "0", the 32th bit of SR 20P stores the logical "1" of second sampled pulse E20D, and this logical "1" is stored into the 32th bit location of RWM 20V by the next subsequent accumulation pulse E20T (FIGS. 8c, 8d; t19a-t19b). In the same way, if the pulse E20D appears by 8 times at the phase position corresponding to the contents "0" of counter 24B after pulse E20D appears by, for instance, 131 times, all memory stacks of RWM 20V at the 32th bit location are filled with logical "1" data representing the true phase position of pulse E20D (cf. FIG. 1C). Then, the MSB of 32th bit location of RWM 20V becomes to logical "1", and data D20V containing such logical "1" of MSB is applied to latch 20W. Latch 20W then outputs the set pulse E20W by the clocking of subsequent read/write pulse E20S (FIGS. 8b, 8c; t20).

Figure 11:
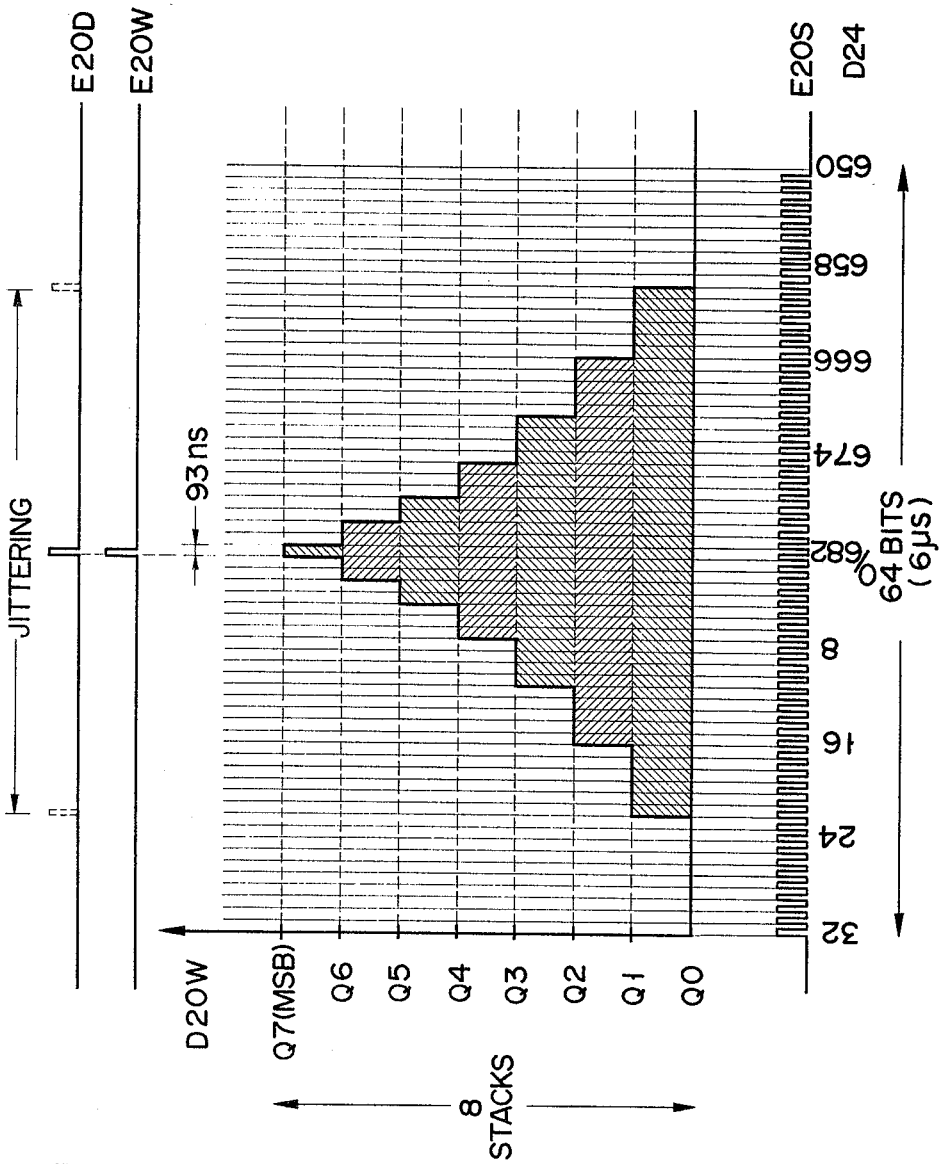
FIG. 11 shows an example of the contents of 8-stack 64-bit RWM 20V shown in FIG. 5.

The phase position of sampled pulse E20D varies with jittering. Therefore, all bit locations of RWM 20V could store the logical "1" of pulse E20D. However, if the 32th bit location corresponds to the true phase position of pulse E20D, the frequency of appearances of logical "1" at the 32th bit location will be maximum in view of probability (FIG. 11). Accordingly, even if the phase position of pulse E20D is jittered, the true phase position can be detected at a given bit location from which the set pulse E20W or the MSB of data D20W is obtained. Therefore, the counter 24 can continue its cyclic count operation in synchronism with the true phase position of pulse E20D irrespective of jitters.

Although specific constructions have been illustrated and described herein, it is not intended that the invention be limited to the elements and constructions disclosed. One skilled in the art will recognize that other particular elements or subconstructions may be used without departing from the scope and spirit of the invention.

What is claimed is:

1. A synchronous signal generator for generating a given cyclic signal in accordance with repetitively appearing specific phase positions of a reference signal inputted thereto, comprising:
   control means responsive to said reference signal for detecting said specific phase positions, for accumulating frequencies of appearances of said specific phase positions at respective phase positions within a given period of time, and for providing a control signal when any of accumulated frequencies of appearances of said specific positions reaches to a given value from which the largest number of said accumulated frequencies is obtained; and
   generator means coupled to said control means and being responsive to said control signal for generating said cyclic signal being forcibly corresponding to said control signal.

2. The generator of claim 1, wherein said generator means includes:
   counter means responsive to said control signal for counting a clock pulse applied thereto to provide count data, said counter means being forcibly set to a given value when said control signal is obtained from said control means; and
   regulator means coupled to said counter means and control means and being responsive to said count data for regulating timings of the detection and accumulation of said specific phase position appearance frequencies in said control means and for generating said cyclic signal according to the contents of said count data.

3. The generator of claim 2, wherein said regulator means includes:
   first gate means coupled to said counter means and control means and being responsive to said count data for generating a first gate signal when said count data falls within a first count range corresponding to said given period of time, said first gate signal defining a period of time for detecting and providing said specific phase positions.

4. The generator of claim 3, wherein said regulator means further includes:
    second gate means coupled to said counter means and control means and being responsive to said count data for generating a second gate signal when said count data falls within a second count range which avoids overlapping with said first count range, said second gate signal defining a period of time for accumulating frequencies of appearances of said specific phase positions.

5. The generator of claim 4, wherein said control means includes:
    sampling means responsive to said reference signal for sampling a given part of said reference signal to provide a sampled pulse indicating said specific phase position.

6. The generator of claim 5, wherein said control means includes:
    register means coupled to said sampling means, first gate means and second gate means, for storing said sampled pulse which appears within a period of time defined by said first gate signal, and for providing contents stored therein as a position pulse during a period of time defined by said second gate signal.

7. The generator of claim 6, wherein said control means includes:
    addition means coupled to said register means for adding said position pulse to the contents thereof to provide added data being formed of a plurality of bits;
    integration memory means coupled to said addition means and being responsive to said second gate signal for memorizing said added data and for supplying said addition means with the contents memorized in said integration memory means as accumulated data being formed of a plurality of bits, said accumulated data corresponding to the contents of said addition means, and the most significant bit of said accumulated data being used as a set pulse which forms a part of said control signal, i.e. said counter means being forcibly set by said set pulse.

8. The generator of claim 6, wherein said control means includes:
    addition means coupled to said register means for adding said position pulse to the contents thereof to provide added data being formed of a plurality of bits;
    integration memory means coupled to said addition means and being responsive to said second gate signal for memorizing said added data and, when said second gate signal is generated, for providing said addition means with the contents memorized in said integration memory means as accumulated data being formed of a plurality of bits, said accumulated data corresponding to the contents of said addition means, the most significant bit of said accumulated data being used as a set pulse which forms a part of said control signal, i.e. said counter means being forcibly set by said set pulse.

9. The generator of claim 5, wherein said control means includes:
    initial set means coupled to said sampling means, counter means and regulator means for generating an initial sync pulse when said sampled pulse appears while said first gate signal disappears, said initial sync pulse forming a part of said control signal, i.e. said counter means being forcibly set by said initial sync pulse.

10. The generator of claim 6, wherein said control means includes:
    initial set means coupled to said sampling means, counter means and regulator means for generating an initial sync pulse when said sampled pulse appears while said first gate signal disappears, said initial sync pulse forming a part of said control signal, i.e. said counter means being forcibly set by said initial sync pulse.

11. The generator of claim 7, wherein said control means includes:
    initial set means coupled to said sampling means, counter means and regulator means for generating an initial sync pulse when said sampled pulse appears while said first gate signal disappears, said initial sync pulse forming a part of said control signal, i.e. said counter means being forcibly set by said initial sync pulse.

12. The generator of claim 8, wherein said control means includes:
    initial set means coupled to said sampling means, counter means and regulator means for generating an initial sync pulse when said sampled pulse appears while said first gate signal disappears, said initial sync pulse forming a part of said control signal, i.e. said counter means being forcibly set by said initial sync pulse.

13. The generator of claim 9, wherein said control means further includes:
    timer counter means coupled to said sampling means and regulator means and being responsive to one or more specific pulses of said sampled pulse which appears at the time when said first gate signal appears, for counting said specific pulses and for generating a switch signal when a given number of pulses of said specific pulses is counted; and
    selector means coupled to said initial set means, timer counter means, integration memory means and counter means and being responsive to said switch signal, for selecting as said control signal either said initial sync pulse or said set pulse, said selector means selecting said set pulse when said switch signal is generated.

14. The generator of claim 10, wherein said control means further includes:
    timer counter means coupled to said sampling means and regulator means and being responsive to one or more specific pulses of said sampled pulse which appears at the time when said first gate signal appears, for counting said specific pulses and for generating a switch signal when a given number of pulses of said specific pulses is counted; and
    selector means coupled to said initial set means, timer counter means, integration memory means and counter means and being responsive to said switch signal, for selecting as said control signal either said initial sync pulse or said set pulse, said selector means selecting said set pulse when said switch signal is generated.

15. The generator of claim 11, wherein said control means further includes:
    timer counter means coupled to said sampling means and regulator means and being responsive to one or more specific pulses of said sampled pulse which appears at the time when said first gate signal appears, for counting said specific pulses and for generating a switch signal when a given number of pulses of said specific pulses is counted: and selector means coupled to said initial set means, timer counter means, integration memory means and counter means and being responsive to said switch signal, for selecting as said control signal either said initial sync pulse or said set pulse, said selector means selecting said set pulse when said switch signal is generated.

16. The generator of claim 12, wherein said control means further includes:

timer counter means coupled to said sampling means and regulator means and being responsive to one or more specific pulses of said sampled pulse which appears at the time when said first gate signal appears, for counting said specific pulses and for generating a switch signal when a given number of pulses of said specific pulses is counted: and selector means coupled to said initial set means, timer counter means, integration memory means and counter means and being responsive to said switch signal, for selecting as said control signal either said initial sync pulse or said set pulse, said selector means selecting said set pulse when said switch signal is generated.

17. The generator of claim 13, wherein said selector means includes:

means coupled between said initial set means and said counter means and between said integration memory means and said counter means and being responsive to said second gate signal, for inhibiting the forcible set operation of said counter means by said control signal at the time when said second gate signal is generated.

18. The generator of claim 14, wherein said selector means includes:

means coupled between said initial set means and said counter means and between said integration memory means and said counter means and being responsive to said second gate signal, for inhibiting the forcible set operation of said counter means by said control signal at the time when said second gate signal is generated.

19. The generator of claim 15, wherein said selector means includes:

means coupled between said initial set means and said counter means and between said integration memory means and said counter means and being responsive to said second gate signal, for inhibiting the forcible set operation of said counter means by said control signal at the time when said second gate signal is generated.

20. The generator of claim 16, wherein said selector means includes:

means coupled between said initial set means and said counter means and between said integration memory means and said counter means and being responsive to said second gate signal, for inhibiting the forcible set operation of said counter means by said control signal at the time when said second gate signal is generated.

* * * * *